United States Patent [19]

Ray

[11] 3,829,110
[45] Aug. 13, 1974

[54] TURN-LEAN RESTRICTER FOR MOTORCYCLES

[76] Inventor: Louis Z. Ray, 1712 79th Ave., Oakland, Calif. 94621

[22] Filed: May 10, 1973

[21] Appl. No.: 359,106

[52] U.S. Cl. .................................. 280/8, 280/302
[51] Int. Cl. .......................................... B62b 19/00
[58] Field of Search .......... 280/8, 12 R, 126, 150 C, 280/30, 33, 289, 293, 301–303

[56] References Cited
UNITED STATES PATENTS

| | | | |
|---|---|---|---|
| 2,289,661 | 7/1942 | Lewis | 280/293 |
| 2,835,499 | 5/1958 | Andren et al. | 280/8 |

*Primary Examiner*—Stanley H. Tollberg
*Assistant Examiner*—Norman L. Stack, Jr.
*Attorney, Agent, or Firm*—Joseph B. Gardner

[57] ABSTRACT

A turn-lean restricter mounted upon a motorcycle having a frame and a chain casing defining an oil reservoir connected with the motorcycle engine and through which engine lubricant flows. The restricter has an elongated plate generally underlying the chain casing and particularly the outer lower corner portion thereof. Front and rear fastener structures secured to the plate respectively adjacent the front and rear end portions thereof are secured directly or indirectly to the frame and support the plate at an angular inclination in which it angles inwardly and downwardly. The rear fastener structure is fixedly secured to the frame, and the front fastener structure is pivotally related thereto, thereby enabling the plate to twist and deflect in generally vertical directions upon ground-engaging impact.

10 Claims, 5 Drawing Figures

PATENTED AUG 13 1974    3,829,110

TURN-LEAN RESTRICTER FOR MOTORCYCLES

This invention relates generally to motorcycles and like vehicles and, more particularly, to a turn-lean restricter for a motorcycle or the like to yieldingly restrict the angular inclination that can be assumed by the motorcycle when turning in one direction and at the same time protect certain components of the motorcycle from ground-engaging abrasion.

The large, heavy duty motorcyles are powerful vehicles intended for road use only, in contrast to light-weight trail bikes, and have relatively large engines and correspondingly large components associated therewith which connect the output shaft of the engine with the rear wheel through the usual clutch assembly. As a specific example, the output shaft of the engine of such motorcycle is generally connected with the rear wheel to impart torque thereto through a pair of endless chains sometimes referred to as primary and secondary chains respectively entrained about a sprocket assembly and engine output shaft, and the sprocket assembly and rear wheel. The primary chain and sprocket assembly (at least in part) is enclosed within a general or primary casing that is closed and forms a part of the lubrication system in that lubricant for the engine flows into such casing and is recirculated therefrom. The casing is fixedly related to the frame of the motorcycle and extends outwardly beyond the frame along one side thereof adjacent its lower extremity.

A heavy duty motorcycle of the type being considered may weigh of the order of 1,000 pounds, and is able to traverse relatively sharp turns requiring the angle of lean to vary sharply in the direction of the turn. When turns of this type are made toward the side on which the chain casing projects, it is not uncommon for the casing to skid or scrape along the ground. In fact, it is not uncommon in motorcycles of this type to replace the casings periodically, perhaps after first repairing the casing on several occasions to seal openings abraded therein which otherwise permit loss of the lubricant. Replacing and repairing casings is relatively expensive, and the possibility of lubricant loss is serious because, unless promptly discovered, it can cause engine destruction. Of equal consequence, however, is the possibliity of accident and injury to one riding the motorcycle upon impact of the casing with the ground.

In view of the foregoing, an object of the present invention is to provide a turn-lean restricter for motorcycles and like vehicles operative to alert the driver when the inclination of the motorcycle has reached a predetermined angle when a turn is being traversed in the direction in which the motorcycle has protuberances projecting laterally beyond the limits of the frame structure thereof, and which restricter resists increasing inclinations of the motorcycle beyond such angle; and also protects certain components of the motorcycle from abrasion and impact damage otherwise caused thereto by engagement thereof with a ground surface.

Additional objects, among others, of the present invention are in the provision of a turn-lean restricter of the character described that is adapted to be mounted upon a motorcycle quickly and easily without structural damage therein by utilizing presently existing components thereof; that includes an elongated plate adapted to extend along the frame of the motorcycle in generally underlying relation with the outer corner portion of the chain casing thereof to protect the same from damage; that is equipped with with axially spaced front and rear fastener structures secured to the plate and adapted to mount the same upon the motorcycle in a manner such that the plate inclines inwardly and downwardly; and in which the plate is twistable about a longitudinally extending axis and is deflectible in generally vertical directions upon ground-engaging impact so as to yieldingly but progressively resist leaning of the motorcycle beyond a predetermined angle so as to safely alert the driver to his then present operational condition.

Additional objects and advantages of the invention, especially as concerns particular features and characteristics thereof, will become apparent as the specification continues.

An embodiment of the invention is illustrated in the accompanying drawing, in which.

Figure 1:
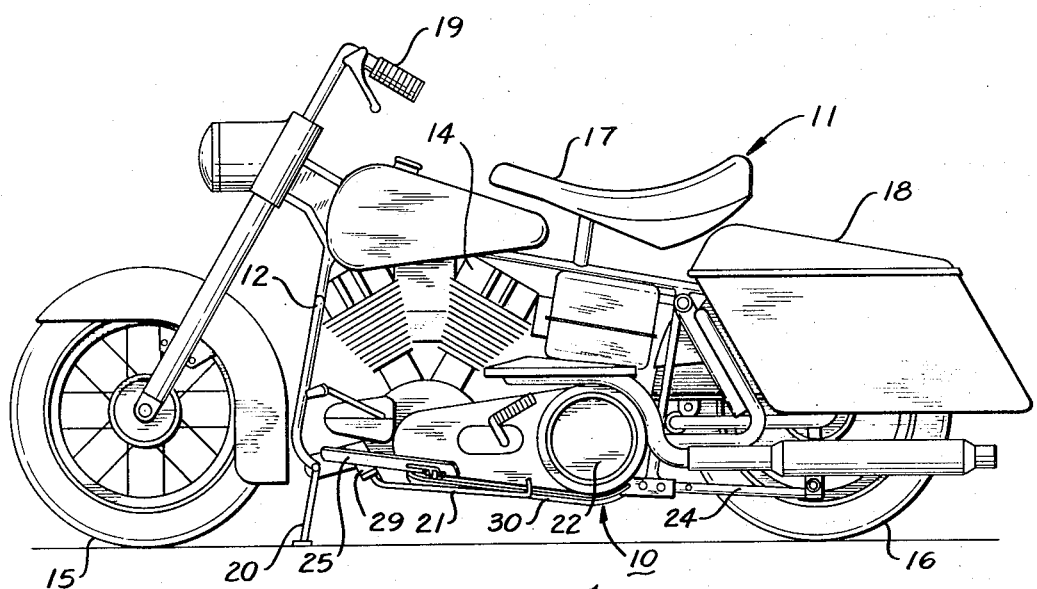
FIG. 1 is a side view in elevation of a motorcycle embodying the invention.

The turn-lean restricter embodying the present invention is denoted generally in the drawing with the numeral 10. It is shown in mechanical and functional association with a motorcycle 11 which, as respects the present invention, may be totally conventional and, in the form shown, is a relatively heavy, large motorcycle as, for example, a 2-cylinder Harley Davidson. The motorcycle 11 has a frame 12 that either directly or indirectly supports all of the components of the motorcycle including the engine 14, front and rear wheels 15 and 16, seat 17, luggage compartment 18, and handlebar structure 19 by means of which the front wheel 15 is turned.

The motorcycle further has a U-shaped stand 20 by means of which it can be supported in a substantially vertical inclination, a kickstand 21 that enables the cycle to be supported at an angular inclination when not in use (leaning toward the left-hand side in the particular motorcycle being considered), and a chain casing 22 that encloses a sprocket assembly and the primary chain which connects the same with the output shaft of the engine 14. A seconary chain connects the sprocket assembly with the rear wheel 16 in a completely standard manner.

Figure 2:
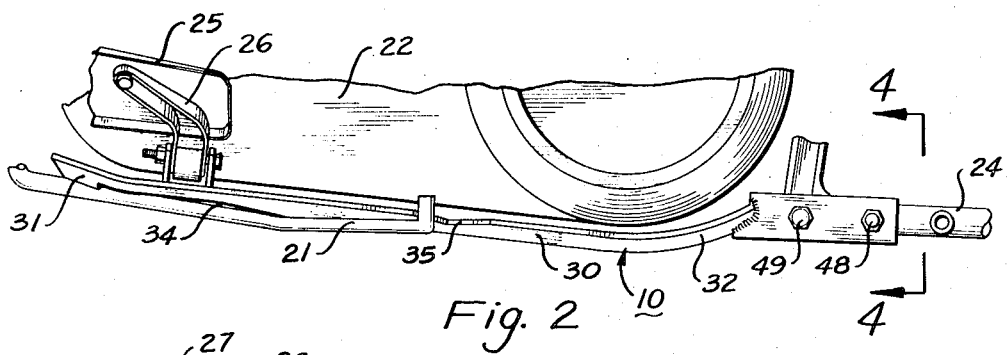
FIG. 2 is an enlarged, broken side view in elevation of the portion of the motorcycle shown in FIG. 1 having the turn-lean restricter attached thereto.
Figure 3:
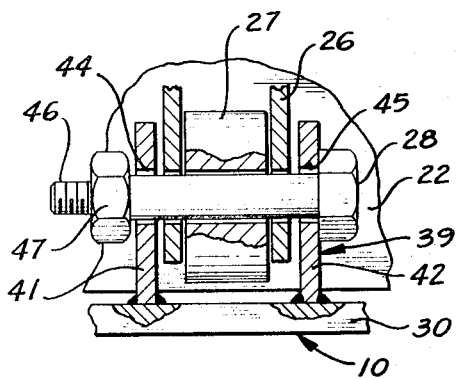
FIG. 3 is a further enlarged, broken vertical sectional view through the front fastener structure of the restricter.
Figure 4:
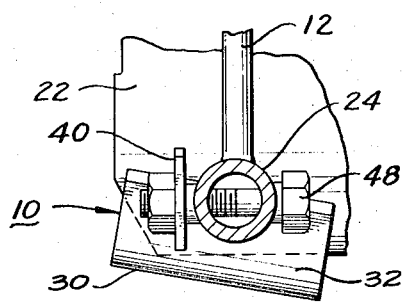
FIG. 4 is a broken vertical sectional view taken along the line 4—4 of FIG. 2.

The frame 12 has one or more components extending from front to rear generally along the bottom of the motorcycle, one of which is shown in FIGS. 1, 2 and 4 and is denoted with the numeral 24. The casing 22 is fixed or rigid with respect to the frame 12 and extends outwardly therefrom along the lower extremity thereof on its left-hand side, as shown best in FIG. 4. Thus, in traversing a left turn, the motorcycle leans toward the left and brings the lower outer corner portions of the casing 22 into closer proximity with the ground surface. In the particular motorcycle 11 being considered, a footrest 25 is supported upon the casing 22 adjacent the forward end thereof for pivotal displacements about a generally horizontal axis for movements between a lower position of use and a raised position in which it extends generally along the outer face of the casing 22.

In this reference, the footrest 25 is fixedly secured to a support strap 26 having spaced apart arms that span a mounting boss 27 welded or otherwise rigidly attached to the casing 22. A support bolt 28 extends through openings provided therefor in the spaced arms of the strap 26 and boss 27 so as to secure the strap to the boss but accommodate relatively free pivotal displacements of the strap with respect to the boss and, therefore, of the foot support 25 with respect to the casing. This support mounting is conventional on the motorcycle 11 being considered. The kickstand 21, as shown best in FIG. 1, extends outwardly and rearwardly at an angular disposition generally underlying the casing 22, and at its inner end it is pivotally attached to the frame 12 by a spring-equipped mounting component 29. As previously indicated, the motorcycle 11 shown and as described is wholly conventional and need not be further considered in detail.

Figure 5:
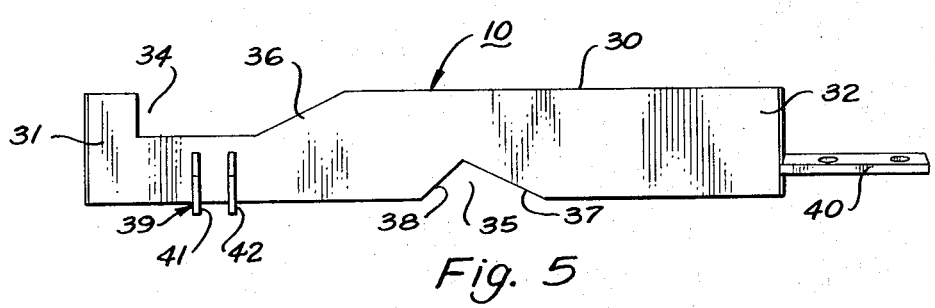
FIG. 5 is a top plan view of the restricter removed from the motorcycle.

The turn-lean restricter 10 comprises an elongated plate 30 adapted to extend along the frame 12 in generally underlying relation with the outer corner portion of the casing 22, as is most evident in FIGS. 2 and 4. The restricter plate 30 is generally rectangular in top plan view (as is most evident in FIG. 5) but is curved upwardly at its front and rear end portions, as shown in FIG. 2 and respectively denoted with the numerals 31 and 32. The plate 30 also has inner and outer recesses 34 and 35 that accommodate the kickstand 21, as shown in FIG. 2. The forwardly facing corner portions 36 and 37 of the respective recesses 34 and 35 (see FIG. 5) are relieved for safety purposes so that they do not present sharp or pointed surfaces which might catch obstructions and cause one driving the motorcycle to lose control thereof. Similarly, the corner portion 38 of the outer recess 35 adjacent the leading outer edge thereof is relieved for this same purpose.

The restricter 10 also has front and rear fastener structures 39 and 40, respectively. These fastener structures are secured to the plate 30 adjacent the front and rear end portions thereof and are used in mounting the restricter 10 upon the motorcycle 11. The front fastener structure 39 comprises a pair of axially spaced mounting ears 41 and 42 welded or otherwise rigidly secured to the plate 30 and extending upwardly therefrom. The ears 41 and 42 are respectively provided with apertures 44 and 45 which freely pass the shank of the bolt 28 therethrough and thereby permit the ears to rotate about the axis of the bolt. It will be evident that the shank of the bolt 28 is somewhat larger in diameter than the threaded end portion 46 thereof, thereby providing a positive limit beyond which the nut 47 cannot be tightened, to thus avert relatively free angular displacements of both the front fastener structure 39 and footrest 25 relative to the bolt 28, boss 27, and casing 22.

The rear fastener structure 40 is also welded or otherwise fixedly secured to the plate 30, and it extends rearwardly therefrom and is fixedly secured to the component 24 of the frame 12 by a plurality of bolts 48 and 49 extending therethrough. The bolts 48 and 49 may also be standard components of the motorcycle 11, used to interconnect a plurality of frame components thereof which have not been shown for purposes of simplifying the drawing. It may be observed, therefore, that the turn-lean restricter 10 is mounted upon the motorcycle 11 by means of the front and rear fasteners 39 and 40 without structurally altering the motorcycle 11.

The fastener structures 39 and 40 are secured to the plate 30 so as to support the same relative to the frame 12 of the motorcycle at an angular inclination in which the plate inclines inwardly and downwardly, as shown in FIGS. 2 and 4. Accordingly, the plate 30 is adapted to slidingly engage the ground surface upon the motorcycle leaning beyond a predetermined angle toward the left when traversing a turn in that direction. More particularly, the plate is adapted to engage such ground surface along the inner lower edge portion thereof before the outer upper corner portion touches such surface, thereby progressively coming into contact throughout larger surface areas thereof with such ground surface so as to increasingly resist or restrict the angle of turn or, more precisely, the angle at which the motorcycle leans. Thus, a considerable increase in safety results from use of the restricter 10.

The restricter 10 and plate 30 thereof are also deflectible in generally vertical directions upon groundengaging impact so as to yieldingly resist leaning of the motorcycle. Such deflectibility of the plate 30 is a consequence of several factors. First, the plate is elongated and is supported by the fastener structures 39 and 40 at axially spaced locations, thereby causing the restricter to have spring-like characteristics analogous to that of a torsion bar, permitting it to twist somewhat generally about a longitudinal axis. Second, the front fastener structure 39 is pivotally related to the frame and casing of the motorcycle so as to permit the plate to pivot relatively freely about the axis of the bolt 28 which implements or enhances the natural twistability of the plate. Third, the character of the rear fastener 40 and interconnection thereof with the plate 30 contributes to the twistability or generally vertical displaceability of the plate and restricter 10. Additionally, the fastener structures support the plate 30 at an angular disposition in which it inclines forwardly and upwardly, as shown in FIG. 2, thereby tending to confine any impact between the plate and ground surface to the rear portion of the plate which results in a relatively long torsion and lever arm being effective between such point of ground engagement and the front fastener structure 39.

In use of the restricter 10, it is first mounted upon the motorcycle 11 without structural alteration thereof, using the front and rear bolt assemblies 28, 48 and 49, as previously explained. The recesses 34 and 35 accommodate the kickstand 21 so as to permit it to be used without alteration in a completely conventional manner. Similarly, the footrest 25 functions without change. Should the restricter 10 require change because of damage or wear, it can be replaced in a few minutes simply by removing the bolts to release the restricter then mounted upon the motorcycle and replacing it with another.

Ordinarily the restricter 10 is spaced a substantial distance above the ground when the motorcycle 11 is in use, and it has no function when the motorcycle is turned toward the right — a turn in that direction posing no particular difficulty because substantially all of the motorcycle components lie within the interior of the frame 12 on that side. During normal left-hand turns of the motorcycle 11, the restricter 10 remains above the ground level; but should the turn be excessively sharp and the consequent lean of the motorcycle excessive, the rear end portion of the plate 30 engages the ground and thereby immediately tends to restrict or resist greater lean. Should the lean progressively increase, however, the resistance afforded by the resister 10 becomes somewhat greater so as to alert the rider of the condition, but the restricter tends to yield in a generally twisting and upward displacement so as to accommodate the progressive excessive lean of the motorcycle. At the same time, the plate 30 protects the casing 22 from damage which is exceedingly advantageous in that replacement of the casing is expensive, and any abrasion thereof tending to cause leakage therethrough can damage the motorcycle quickly because lubricating oil circulates through the casing 22 into and from the engine 14, and any loss of lubricant could destroy the engine.

All of these advantages are achieved without interfering or otherwise limiting the ordinary use of the motorcycle and, most importantly, without introducing safety hazards and in fact contributing to the safe use and operation of the motorcycle.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

What is claimed is:

1. A turn-lean restricter for a motorcycle or the like having a frame and a chain casing fixed with respect thereto and extending outwardly beyond the frame along one side thereof adjacent its lower extremity, comprising: an elongated plate adapted to extend axially along such frame in generally underlying relation with the outer corner portion of such chain casing; and front and rear fastener structures secured to said plate respectively adjacent the front and rear end portions thereof for mounting said turn-lean restricter upon such motorcycle, said fastener structures being secured to said plate so as to support the same relative to the frame of such motorcycle at an angular inclination in which the plate inclines inwardly and downwardly and is adapted to slidingly engage the ground surface upon such motorcycle leaning beyond a predetermined angle toward the aforesaid side when traversing a turn in that direction.

2. The turn-lean restricter of claim 1 in which such motorcycle is equipped with a kickstand underlying a portion of the chain casing thereof when the kickstand is retracted, and in which said plate is provided with inner and outer recesses oriented to receive portions of such kickstand in the retracted position thereof.

3. The turn-lean restricter of claim 1 in which said plate is curved upwardly adjacent the front and rear end portions thereof to obviate the presence of sharp ground-engageable corner portions.

4. The turn-lean restricter of claim 1 in which said fastener structures are axially spaced to enable the plate to twist along a longitudinal axis extending generally therebetween upon substantial abutment of the plate with a ground surface.

5. The turn-lean restricter of claim 1 in whiich one of said fastener structures defines a pivotal support for said plate relative to such motorcycle frame to enable the plate to be deflectible in generally vertical directions upon ground-engaging impact thereof.

6. The turn-lean restricter of claim 5 in which said rear fastener structure is fixedly secured to said frame and the front fastener structure defines the aforesaid pivotal support.

7. The turn-lean restricter of claim 1 in which such motorcycle is equipped with a kickstand underlying a portion of the chain casing thereof when the kickstand is retracted, in which said plate is provided with at least one recess oriented to receive a portion of such kickstand in the retracted position thereof, in which said plate is curved upwardly adjacent the front and rear end portions thereof to obviate the presence of sharp ground-engageable corner portions, and in which said plate is deflectible in generally vertical directions upon ground-engaging impact.

8. The turn-lean restricter of claim 7 in which one of said fastener structures defines a pivotal support for said plate relative to such motorcycle frame to enable the plate to be deflectible in generally vertical directions upon ground-engaging impact thereof.

9. The turn-lean restricter of claim 8 in which said rear fastener stucture is fixedly secured to said frame and the front fastener structure defines the aforesaid pivotal support, and in which the forwardly facing corner portion of said recess is relieved.

10. The turn-lean restricter of claim 8 in combination with a motorcycle having a frame, a chain casing fixed with respect thereto and extending outwardly beyond the frame along one side thereof adjacent its lower extremity, and a kickstand underlying a portion of said casing, said rear fastener structure being fixed to said frame and said front fastener structure being pivotally related thereto.

* * * * *